May 5, 1931.    G. ABBONA    1,803,744
TRANSMISSION
Filed Oct. 13, 1930    2 Sheets-Sheet 2

Inventor
Giacomo Abbona

By Clarence A. O'Brien
Attorney

Patented May 5, 1931

1,803,744

UNITED STATES PATENT OFFICE

GIACOMO ABBONA, OF MONDOVI BREO, ITALY

TRANSMISSION

Application filed October 13, 1930. Serial No. 488,512.

This invention relates to new and useful improvements in transmissions and more particularly to devices of this character which are adapted for use in motor vehicles such as automobiles, but it is to be understood that a transmission in accordance with this invention may be utilized for any purpose for which the same is found adapted and desirable.

The primary object of the invention is to provide, in a manner as hereinafter set forth, a transmission of the aforementioned character embodying a novel construction and arrangement of parts whereby any desired speed within a given range may be attained at will.

Another important object of the invention is to provide a transmission of the character described of a construction whereby the various speeds may be attained without the necessity of shifting gears and the invention aims still further to provide a device for reversing the rotation of the driven or propeller shaft, said propeller shaft adapted to be driven at the same speeds in either direction.

Other objects of the invention are to provide a transmission of the aforementioned character which will be simple in construction, strong, durable, efficient in its use, which may be manufactured at low cost and which may be expeditiously installed for use on automobiles and other vehicles of conventional construction without the necessity of materially altering the same structurally.

All of the foregoing and still further objects and advantages of the invention may become apparent from a study of the following specification, taken in connection with the accompanying drawings wherein like characters of reference designate corresponding parts throughout the several views, and wherein:—

Figure 3 is a detail view in side elevation of the revolving gear supporting casting.

Figure 4 is a detail view in front elevation of the gear supporting casting.

Figure 1:
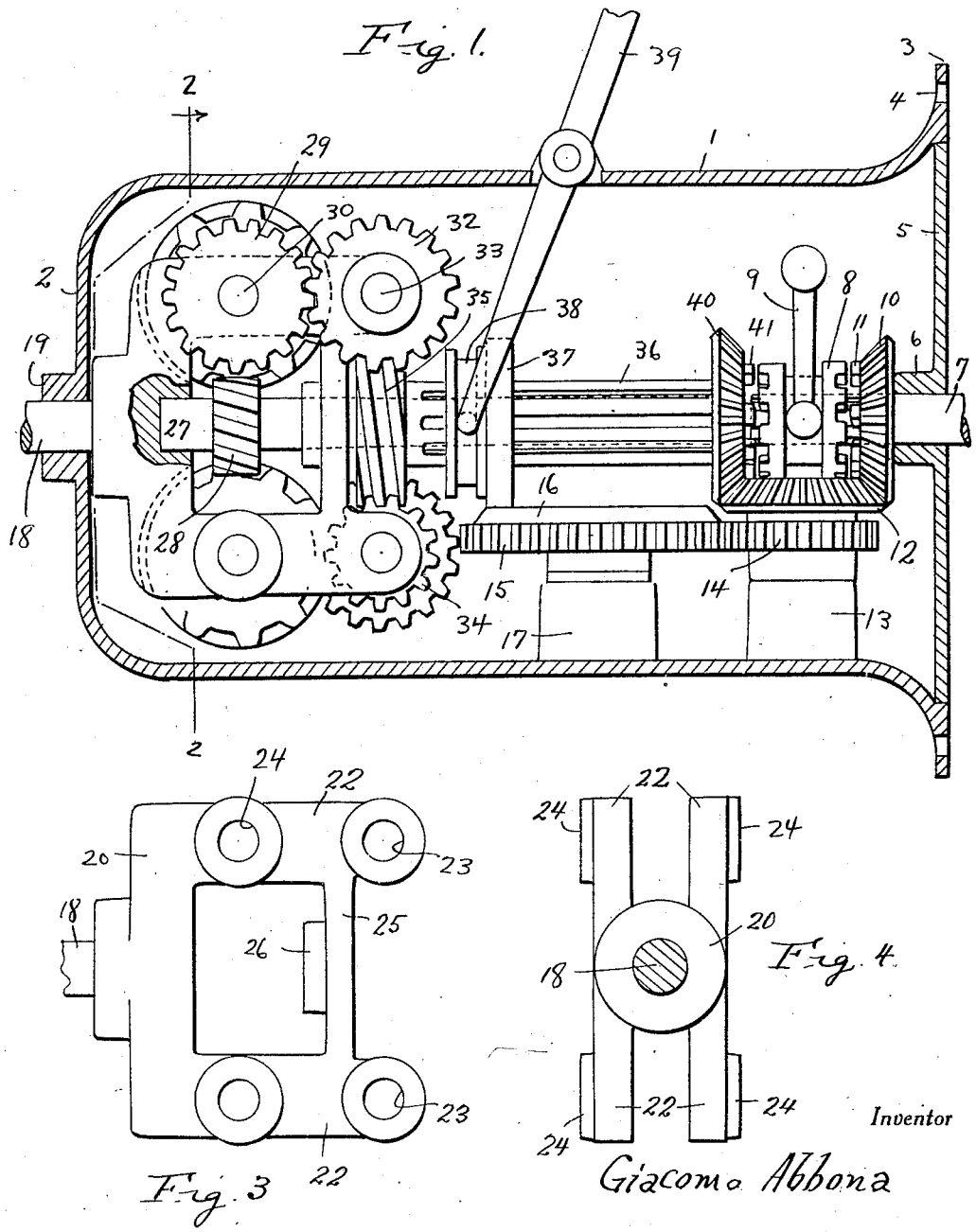
Figure 1 is a view in vertical longitudinal section through a transmission constructed in accordance with this invention.

Referring to the drawings in detail and to Figure 1 thereof in particular, it will be seen that the reference numeral 1 designates an elongated, horizontally disposed cylindrical housing provided with a rear end wall 2, said housing being open at its forward end and formed with an integral out-turned flange 3 provided with the spaced holes 4 for the passage of securing bolts for mounting the same in position on a support. The open end of the housing 1 is closed by a removable disk or plate 5 which is seated within said housing in a manner to be disposed flush with the forward side of the flange 3, as clearly illustrated in Figure 1 of the drawings.

Extending rotatably through the bearing 6 which is formed centrally on the disk 5 and projecting into the housing 1 for a suitable distance is a drive shaft 7 which is connected with a suitable source of power (not shown).

A double faced clutch 8 is keyed for longitudinal sliding movement on the inner end portion of the drive shaft 7 and said clutch is operable through the medium of the yoke 9. A beveled gear 10 is loosely mounted on the shaft 7 at the inner end of the bearing 6 and is provided, on its inner face, with a clutch 11 for engagement with the adjacent face of the clutch 8. The gear 10 is constantly in mesh with a beveled gear 12 which is mounted for rotation in the thrust bearing 13 which projects upwardly from the housing 1. A gear 14 is formed integrally with the beveled gear 12 and is in constant mesh with a gear 15 formed integrally with the friction disk 16 mounted for rotation in the thrust bearing 17.

A driven or propeller shaft 18 extends rotatably through the bearing 19 formed centrally in the rear wall 2 of the housing 1 and has fixed on its inner end a skeleton casting or frame 20 which is of substantially U-shaped configuration and provided with the spaced, parallel arms 22 having the transverse bearing openings 23 in their free end portions and the transverse bearing openings 24 in their intermediate portions. An integral bar 25 extends between the free end portions of the arms 22 of the frame 20 and is provided with a bearing opening 26 through which rotatably extends an intermediate shaft 27 which has its rear end rotatably disposed in a socket provided therefor in the frame 20 in longitudinal alignment with the bearing opening 26. As will be readily apparent, the drive shaft 7, the driven shaft 18 and the intermediate shaft 27 are in longitudinal alignment. The shaft 27 extends forwardly from the casting or frame 20 and terminates in opposed relation to the inner end of the drive shaft 7.

Figure 2:
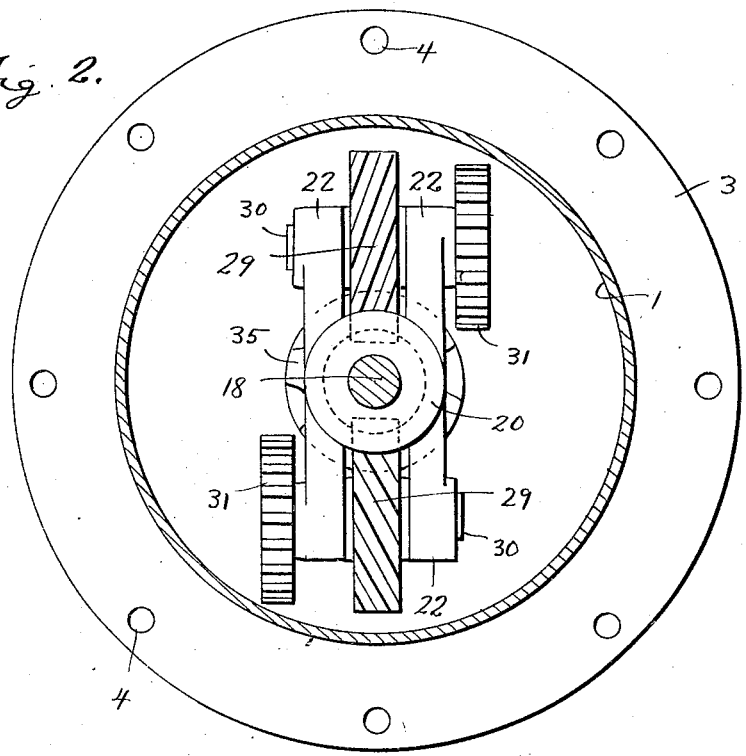
Figure 2 is a vertical cross sectional view taken substantially on the line 2—2 of Figure 1 looking in the direction indicated by the arrows.
Figure 5:
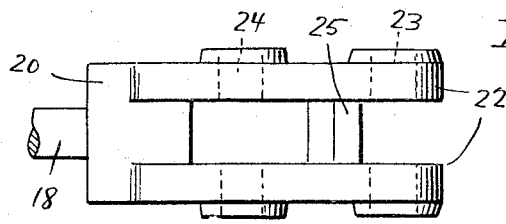
Figure 5 is a detail view in top plan of the gear supporting casting.

A worm pinion gear 28 is fixed on the intermediate shaft 27 in vertical alignment with the bearing openings 24 in the frame 20 and is in constant mesh with the spiral gears 29 which are fixed on the shafts 30 which are mounted for rotation through the bearing opening 24 of the frame 20. As best illustrated in Figure 2 of the drawings, each of the shafts 30 has one end projecting outwardly beyond opposite sides of the frame 20 and mounted on said projecting end portion of each shaft is a gear 31, each of which is fixed on its respective shaft for rotation therewith. As clearly seen in Figures 3, 4 and 5 of the drawings, the arms 22 of the frame 20 each comprises spaced, parallel sections between which the shafts 30 extend and the gears 29 are disposed between the sections of each arm, as seen in Figure 2. The bearing openings 23 and 24 in the opposed section of each arm are, of course, in alignment.

Each of the gears 31 is constantly in mesh with a gear 32 fixed on the outwardly projecting end portions of the shafts 33 mounted for rotation through the bearing openings 23 in the frame 20. Planetary worm gears 34 are fixed on each of the shafts 33 between the sections of the arms 22 of the casting or frame 20 and said planetary gears 34 are in operative engagement with a spiral gear 35 fixed on the rear end of a sleeve 36 which is loosely mounted for rotation on the intermediate shaft 27 forwardly of the casting or frame 20. A friction wheel 37 is splined for longitudinal movement on the sleeve 36 and has formed integrally thereon a grooved extension 38 adapted to operatively receive the forked end of an actuating lever 39 which is pivotally mounted in the housing 1. As will be readily obvious, the friction wheel 37 is for engagement with the disk 16 and is adapted to be moved thereacross through the medium of the lever 39. A beveled gear 40 is fixed on the forward end of the intermediate shaft 27 and is in constant mesh with the beveled gear 12, as clearly seen in Figure 1 of the drawings. The gear 40 is provided with a clutch 41 on one side thereof for engagement with the adjacent side of the clutch 8.

In use, the vehicle may be driven forwardly by engaging the clutch 8 with the gear 40 in a manner to couple said gear and the intermediate shaft 27 to the drive shaft 7. The disk 16 will thus be driven from the gear 40 through the medium of the gear 12, the gear 14 and the gear 15. The gear 28 on the intermediate shaft 27 will impart rotary movement to the spiral gears 29 and through said spiral gears the gears 31 and 32 will be rotated. The gears 32 will drive the planetary gears 34 through the medium of the shafts 33 and said planetary gears 34 will impart rotary movement to the sleeve 36 through the medium of the spiral gear 35 about which said planetary gears travel when rotated. When the friction wheel 37 is in the position illustrated in Figure 1 relative to the disk 16, the direction of rotation of said disk 16 is opposite to that in which the sleeve 36 and said friction wheel 37 will be driven and in this manner the gears 28, 29, 31, 32, 34 and 35 will be locked against rotation and constitute means for keying the intermediate shaft 27 to the casting or frame 20 and thus to the driven or propeller shaft 18. When not retained against all movements, the gears associated with the casting or frame 20 will cause the driven shaft 18 to be operated at the same speed as the drive shaft 7. By shifting the friction wheel 37 inwardly toward the vertical axis of the disk 16, the resistance of same is progressively decreased and rotation of the gears associated with the casting or frame 20 is permitted and the speed at which the propeller shaft 18 is driven is proportionately decreased. Should the friction wheel 37 be moved forwardly beyond the vertical axis of the disk 16, the same will be traveling in the same direction as said disk 16 and the sleeve 36 will thus be free to rotate and will, in fact, be driven by the disk 16, thus permitting free rotation of all of the gears associated with the casting or frame 20 and the driven shaft 18 will remain stationary.

For driving the shaft 18 at various speeds in a reverse direction, it is only necessary to shift the clutch 8 into engagement with the clutch 11 on the gear 10, thus coupling the gear 10 to the shaft 7. As will be obvious the direction of rotation of the friction disk 16 will be reversed and the direction of rotation of the gear 40 and the intermediate shaft 27 upon which said gear 40 is fixed will be reversed through the medium of the intermediate gear 12.

It is believed that the many advantages of a transmission constructed in accordance with this invention will be readily understood, and although the preferred embodiment of the invention is as illustrated and described, it is to be understood that changes in the details of construction may be had which will fall within the scope of the invention as claimed.

What is claimed is:—

A transmission of the class described comprising a housing, a horizontally arranged drive shaft extending into one end of the housing, a horizontally arranged driven shaft extending into the other end of the housing, an intermediate shaft supported for rotary movement in the housing and in alinement with the other shafts, a pair of vertically arranged shafts in the housing, a gear carried by one of said vertical shafts, a friction disk on said gear, a gear carried by the other vertical shaft and meshing with the first gear, a gear loosely arranged on the drive shaft, a gear on the last-mentioned vertical shaft with which the loose gear meshes, a gear fastened to the intermediate shaft and meshing with the last-mentioned gear on the vertical shaft, manually operated clutch means for connecting the drive shaft with either the loose gear or the gear on the intermediate shaft, a sleeve rotatably arranged on the intermediate shaft, a friction disk slidably but non-rotatably mounted on the sleeve, and adapted to engage with the first friction disk, manually operated means for sliding the first disk on the sleeve, U-shaped member having its bight connected with the driven shaft with its limbs of forked construction, a shaft journaled in the extremities of each pair of forks, a gear on the outer end of each shaft, the gears being arranged on opposite ends of the two shafts, a worm gear on each shaft located between the forks, a worm on the sleeve on the intermediate shaft meshing with said worm gears, a shaft journaled in each pair of forks adjacent the bight, a gear on one end of the one shaft and a gear on the opposite end of the other shaft, these gears meshing with the gears on the shafts at the ends of the forks, worm gears on the shafts located adjacent the bight part of the member and located between the forks and a worm on the intermediate shaft meshing with the last-mentioned worm gear.

In testimony whereof I affix my signature.

GIACOMO ABBONA.